Dec. 1, 1953
W. L. ALLEN
2,660,879
SHOCK ABSORBER TESTING AND INDICATING APPARATUS
Filed May 27, 1952
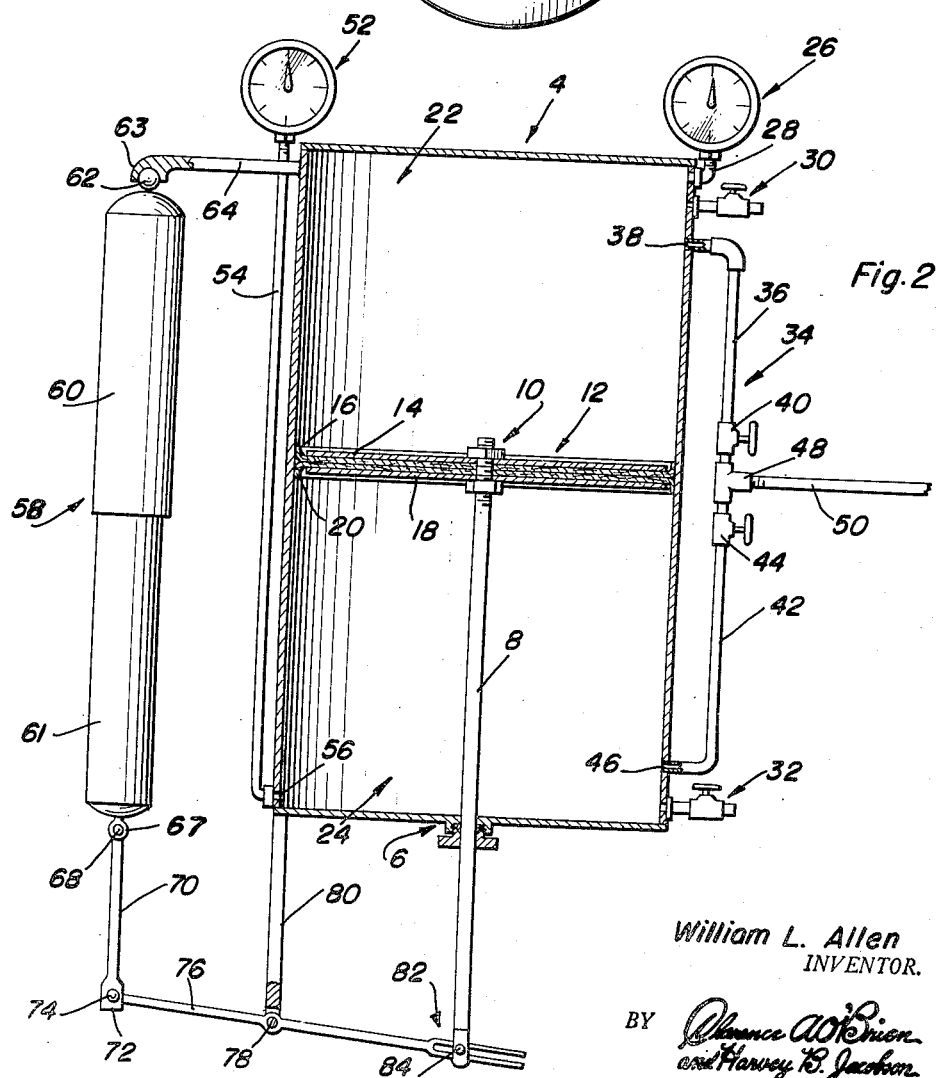
William L. Allen
INVENTOR.

Patented Dec. 1, 1953

2,660,879

UNITED STATES PATENT OFFICE 2,660,879

SHOCK ABSORBER TESTING AND INDICATING APPARATUS

William L. Allen, Searcy, Ark.

Application May 27, 1952, Serial No. 290,213

1 Claim. (Cl. 73—11)

The present invention relates to pressure measuring and indicating gages, generally speaking, and has more particular reference to a practical and reliable apparatus which is expressly constructed and effective when employed to test the efficiency of operation of a vehicle shock absorber, usually one which has been in use for some time and wherein it is then desired to test and check its efficiency and to thus determine if it has to be repaired or replaced.

In carrying out a preferred embodiment of the invention, a purely mechanical construction is adopted, the same being characterized by a piston operating in a cylinder, indicating gages appropriately supported on said cylinder along with valved air delivery means and means for conveniently attaching and supporting the shock absorber which is to be tested.

The piston divides the cylinder into upper and lower chambers and the air delivery means, more specifically revealed, comprises a simple manifold with an air supply pipe connected to its intermediate portion and with its respective branches communicatively connected with the upper and lower chambers and provided with selectively usable cut-off valves.

The shock absorber is suspended from a bracket arm projecting from the upper portion of the cylinder while a link is connected to the lower section or component of the shock absorber, said link being pivotally joined with a balanced lever or beam suspended from the cylinder and connected operatively with a reciprocating rod carried by the piston.

Objects, features and advantages in addition to those mentioned above will become more readily apparent from the following detailed description and the accompanying sheet of drawings.

In the drawings, wherein like numerals are employed to designate like parts through the views:

Figure 1 is a top plan view of the apparatus as constructed in accordance with the principles of the present invention.

Figure 2 is a view in section and elevation taken on the plane of the line 2—2 of Figure 1 looking in the direction of the arrows.

Referring now to the drawing by way of reference numerals and accompanying lead lines and with particular reference to Figure 2, the cylinder is denoted by the numeral 4 and this is fixedly supported in any suitable manner wherever the testing and checking work is to be undertaken. Except for the ports provided for the complemental elements the cylinder is, of course, closed. At the center of the bottom an appropriate stuffing box or gland 6 is provided. This serves to accommodate the reciprocable rod 8 which is appropriately secured as at 10 to the center of the piston 12. The piston comprises an upper disc 14 with a suitably arranged packing cup 16 and a lower disc 18 with a complemental packing cup 20. The piston divides the cylinder into upper and lower chambers 22 and 24. An indicating pressure gage of suitable construction is denoted at 26 and is suitably connected at 28 to the cylinder in communication with the chamber 22. Adjacent thereto is an exhaust pipe in communication with the chamber and provided with a manually regulable bleeder valve 30. There is a similar exhaust and bleed valve 32 at the bottom in communication with the lower chamber 24.

The air supply or delivery means is characterized by an exteriorly arranged manifold 34 having one branch 36 connected at 38 with the upper chamber. This is provided with a manually operable cut-off valve 40. The other lower branch 42 has a similar valve 44 and is communicatively connected at 46 with the lower chamber. There is a T-coupling at 48 with which the main delivery line or pipe 50 is communicatively joined.

There is another pressure indicating gage 52 on the opposite side joined by a pipe 54 with the lower portion of the cylinder and in communication with the lower chamber 24 as at 56.

The shock absorber is denoted at 58 and comprises upper and lower components or sections 60 and 61. The upper shell component has a ball joint element 62 connected with socket means 63 on the lateral bracket arm 64 secured to the upper portion of the cylinder 4 as best shown in Figure 1 said socket means includes an attachable and detachable member 66 to facilitate attaching 60 to the bracket arm 64, in an obvious manner. The lower eye members 67 on the lower section 61 are pivotally connected as at 68 with a depending link 70. The link 70 has its lower end forked or otherwise suitably constructed, as at 72, and pivotally connected at 74 with an adjacent end of the balanced beam or lever 76. The latter is pivoted intermediate its ends as at 78 on a hanger arm 80 depending from the bottom of the cylinder. There is a fork 82 and this is adjustably and pivotally connected at 84 with the lower depending end of the piston rod 8.

In use of the apparatus it is obvious that the shock absorber is removed from the automobile or other vehicle and that the upper part 60 is joined with the arm 64 by the clamping and socket means 63 and 66. The lower section 61 is linked at 70 to the balanced beam or lever 76 as illustrated. To check the upward stroke of the shock it is necessary to close the exhaust valve 30 and also the valve 32 and to open the valve 40 allowing air to flow into the upper chamber of the cylinder, pushing the piston 12 down and showing on the gage 26 the degree of pressure it takes to drive the section 61 telescopically into the shell section 60.

To check the downward stroke the valve 40 is now closed and the exhaust valve 30 is open letting air pressure out of the upper chamber. Then, the valve 30 is again closed and now the valve 44 is opened allowing the air pressure to flow into the lower chamber of the cylinder to force the piston up and measuring the pressure required on the gage 52. The results will determine whether the shock absorber is still properly serviceable or whether it requires repairs or replacement as the case may be.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

An apparatus for testing the efficiency of operation of a vehicle shock absorber comprising a closed cylinder, a piston operable in said cylinder and dividing the latter into upper and lower chambers, a rod secured to said piston and operable through a stuffing box in the bottom of the cylinder and extending below said bottom, a motion transmitting lever, means pivotally supporting an intermediate portion of said lever from said cylinder, one end of said lever being operatively connected with said piston rod, a bracket secured to an upper portion of said cylinder and projecting at right angles from the cylinder and adapted to support one part of said shock absorber, a link pivoted to the other end of said lever and adapted to provide a positive operating connection with the other part of said shock absorber, a pressure indicating gage connected to said upper chamber, a second pressure indicating gage connected to the lower chamber, a bleeder valve connected to the upper chamber, a bleeder valve connected to the lower chamber, and means for delivering air under pressure to said chambers.

WILLIAM L. ALLEN.

References Cited in the file of this patent

UNITED STATES PATENTS

| Number | Name | Date |
|---|---|---|
| 2,081,404 | Marx | May 25, 1937 |
| 2,101,228 | Willard | Dec. 7, 1937 |
| 2,241,794 | Stull | May 13, 1941 |

FOREIGN PATENTS

| Number | Country | Date |
|---|---|---|
| 664,643 | Great Britain | Jan. 9, 1952 |